(12) United States Patent
Kuster et al.

(10) Patent No.: US 6,793,289 B2
(45) Date of Patent: Sep. 21, 2004

(54) SEAT BACK OR SEAT BASE OF AN AUTOMOBILE SEAT

(76) Inventors: Peer Kuster, Munterstrasse 5, Hannover (DE), 30419; Mirko Polak, Petersberger Strasse, Bad Hersfeld (DE), 36251

( * ) Notice: Subject to any disclaimer, the term of this patent is extended or adjusted under 35 U.S.C. 154(b) by 0 days.

(21) Appl. No.: 09/928,518

(22) Filed: Aug. 13, 2001

(65) Prior Publication Data

US 2002/0043870 A1 Apr. 18, 2002

(30) Foreign Application Priority Data

Aug. 25, 2000 (DE) .......................... 100 41 910

(51) Int. Cl.⁷ .................................. A47C 7/02
(52) U.S. Cl. .................. 297/452.52; 5/935; 5/211; 5/212; 267/87; 297/452.53
(58) Field of Search ............... 297/217.3, 452.49, 297/452.52, 452.48, 284.1, 284.4, 284.11, 284.7, 284.8, 452.54, 452.55, 452.18, 452.53; 5/935, 936, 211, 212, 216; 267/80–112, 165

(56) References Cited

U.S. PATENT DOCUMENTS

| | | | | |
|---|---|---|---|---|
| 2,875,819 | A | * | 3/1959 | Hoag |
| 3,034,829 | A | * | 5/1962 | Flint |
| 3,095,188 | A | * | 6/1963 | Giese |
| 3,487,481 | A | * | 1/1970 | Richardson et al. |
| 3,560,049 | A | * | 2/1971 | Burton |
| 5,044,693 | A | * | 9/1991 | Yokota |
| 5,474,358 | A | * | 12/1995 | Maeyaert |
| 5,538,325 | A | * | 7/1996 | Bullard ............ 297/440.22 |
| 5,769,491 | A | * | 6/1998 | Schwarzbich |
| 6,116,694 | A | * | 9/2000 | Bullard ............ 297/452.52 |

* cited by examiner

Primary Examiner—Peter M. Cuomo
Assistant Examiner—Stephen Vu
(74) Attorney, Agent, or Firm—Bourque & Associates, P.A.

(57) ABSTRACT

A seat back or a seat base of an automobile seat with a frame includes a spring system extending between two opposing cross braces consisting of meander-shaped shaped spring wires and upholstery in a seat surface. The level determined by the supporting surface of the shaped wire springs may be so changed by tension belts passing through the shaped wire springs at different tensions that it is more strongly arched when the belts are in relaxed condition than when they are tightened.

12 Claims, 3 Drawing Sheets

SEAT BACK OR SEAT BASE OF AN AUTOMOBILE SEAT

FIELD OF THE INVENTION

The invention relates to a stiffness adjustment mechanism for a seat back or seat base such as used in an automobile.

BACKGROUND OF THE INVENTION

Automobile seat back or seat base of the type described in German patent DE 297 23 586 U1, utilizes shaped wire springs which extend parallel to the direction of vehicle travel with one end permanently attached to a cross brace of a frame part while the other end is attached to an adjustment member by means of which the separation between the anchoring points may be altered. The known solution allows alteration of seat stiffness by increasing or decreasing the tension. When the tension is changed, there is practically no alteration to the upper surface shape of the seat base or of the seat back. The position or shape of the side bolsters or supports, in particular, does not change.

In another system, it was also suggested that a seat base be provided with alterable side bolsters as well as with a central spring system whose tension may be altered. Thus, the position of the side bolsters or of their upper edge areas can be dislocated or adjusted depending on the hardness of the seat springs so that a higher degree of seat stiffness is related to a higher position of the edge area. Such a solution is useful because a sporty driver who prefers a firm and hard seat also requires good lateral support provided by shaped side bolsters. A comfort-oriented driver, on the other hand, prefers a soft, comfortable seat with less-pronounced side bolsters. With this system, however, two adjustment mechanisms were provided.

SUMMARY OF THE INVENTION

The present invention features a tension mechanism for a seat having a frame with a plurality of springs having an undulating shape defining tension belt receiving areas and having a support side. The plurality of springs are attached between two opposing braces in the seat frame.

The tension mechanism includes a plurality of tension belts having first and second ends and disposed in the tension belt receiving areas of the springs and adapted for adjusting a vertical displacement of the support side of each of the plurality of springs. Each of the plurality of tension belts are coupled proximate at least the first end to a tension belt tensioning device adapted to produce more or less tension in the tension belts, wherein the vertical displacement of the support side of each of said plurality of springs is less when the plurality of tension belts are under low tension than when they are under higher tension.

The present invention also provides a seat back or seat base wherein adjustment of the upholstery stiffness in the central area of the seat back or seat base effects a shape change of the central area of the seat shape or back shape and not the side regions of the seat, and wherein the difference between the central seating surface height and the side bolster height is greater for increased seat stiffness than for low seat stiffness, whereby the position of the side bolster itself remains unchanged and need not be adjusted.

The invention creates a side bolster height corresponding to the current seat stiffness without providing an adjustment mechanism for the side bolster. The solution proposed by the invention thus allows simple adaptation of the seat shape to various user wishes without involving great expense or complex mechanisms.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 5:
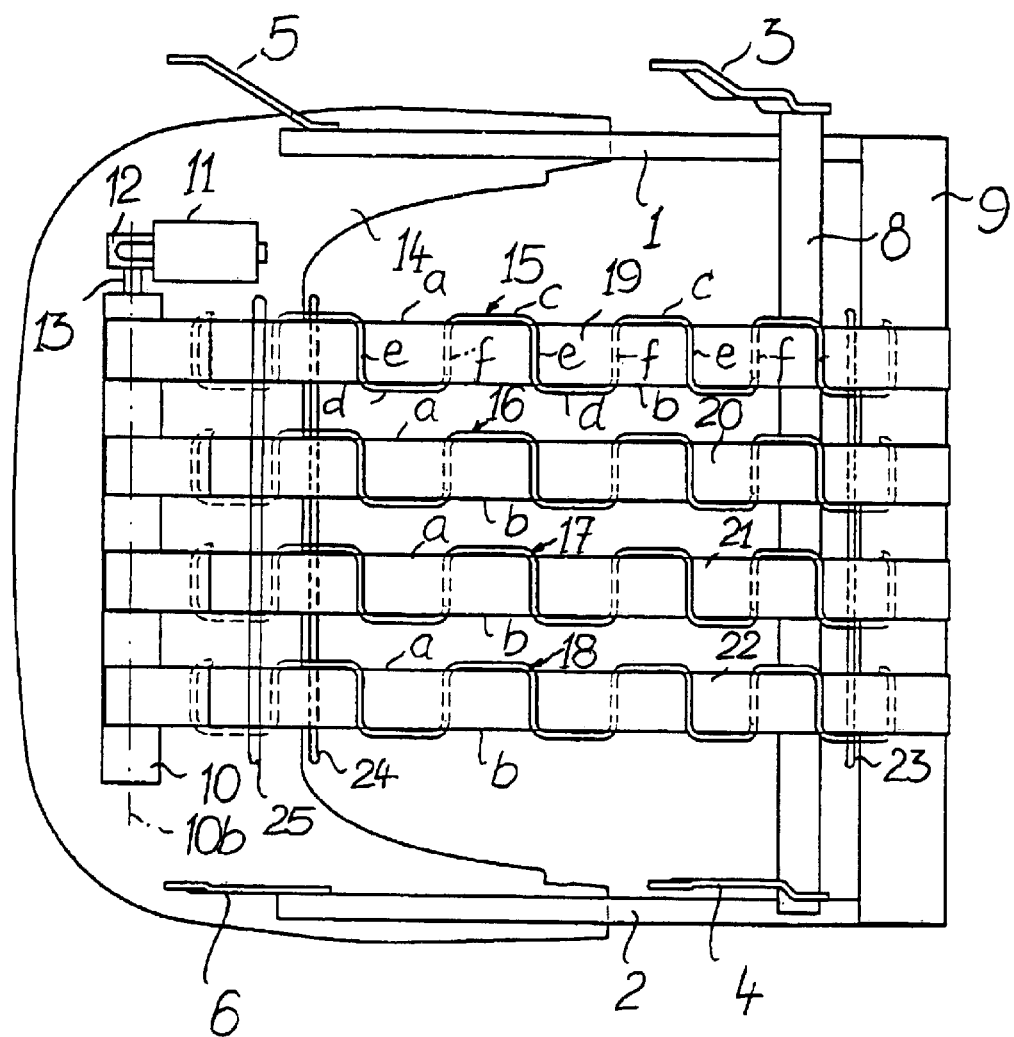
FIG. 5 is a bottom view of the seat base as in FIG. 1.

Although an automobile seat base is shown in the drawings and described herein, this is not a limitation as the invention may be used in the same manner for an automobile seat back as well as other seat bases or backs. The typical seat base includes a frame that is formed from two parallel side braces 1 and 2, FIG. 3, and two cross-braces 9 and 14, FIG. 5, connecting the side braces 1 and 2 together. Front connecting pieces 5 and 6, and rear connecting pieces 3 and 4, are attached to the side braces 1 and 2, by means of which the automobile seat height may be adjusted. The rear connecting pieces 3 and 4 connect the parts of a connecting tube 8 together so that they may not rotate.

Several undulating or U-shaped wire springs 15–18 extend between the front cross brace 14 and the rear cross brace 9 that form the spring system for the seat. The U-shape or undulating shape extends generally in a horizontal direction. Each of the shaped wire springs 15–18 contains alternating, longitudinally-offset side flanges c and d that are connected together by means of cross-placed cross flanges or cross members e and f forming the undulating or U-shaped spring.

Between the offset side flanges c and d of the shaped wire spring 15 runs a tension belt 19 whose side edges a and b extend parallel to the side flanges c and d. The tension belt 19 is then fed (much like weaving) alternately over cross flange e and under cross flange f. In the same manner, a tension belt 20 passes through the shaped wire spring 16; a tension belt 21 through the shaped wire spring 17; and a tension belt 22 through the shaped wire spring 18.

The tension belts 19–22 each have one of their ends attached to the rear cross brace 9. Their other end of the tension belts is fed through and attached to a wind-up spool 10 and attached using a loop 19a, FIGS. 1 and 2, to one of the attachment areas 10a of the wind-up spool 10. The tension belts 19–22 are passed adjacent to each other to the rear cross brace 9 around a direction-changing rod 23 positioned below the springs. In the front area of the springs, other direction-changing device such as rods 24 and 25 are positioned crosswise to the direction of the tension belts 19–22 that form a direction-changing frame for the tension belts. The wind-up spool 10 rotates about an axis 10b and is connected to a drive shaft 13 that may be driven via direction-changing gear 12 and a drive motor 11.

Figure 1:
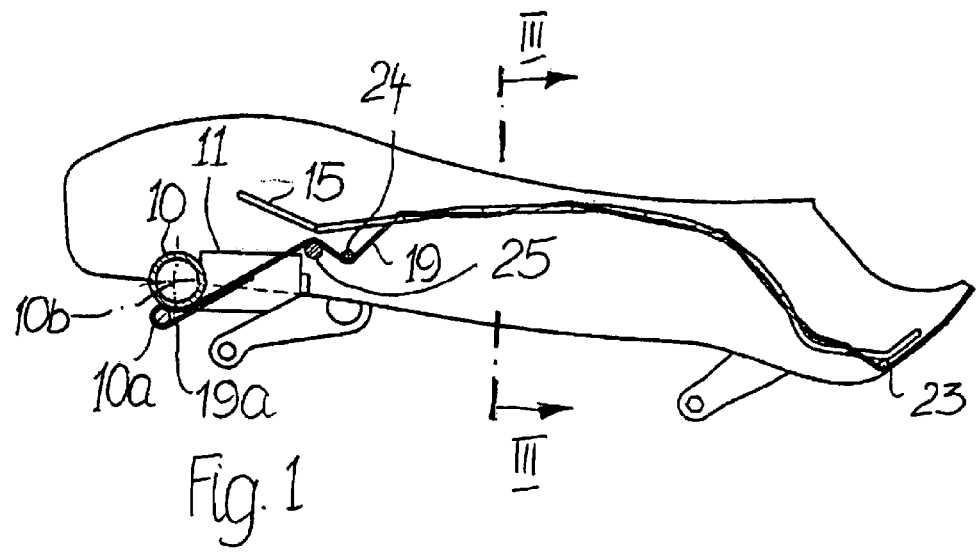
FIG. 1 is a schematic longitudinal cutaway view through a seat base with its springs set for comfort.
Figure 2:
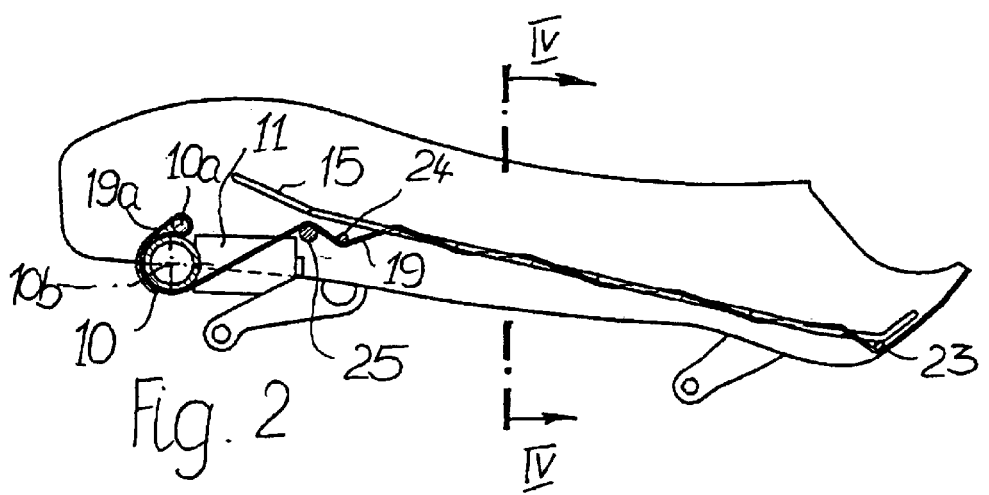
FIG. 2 is a longitudinal cutaway view through a seat base in FIG. 1 with its springs set for stiffness.
Figure 3:
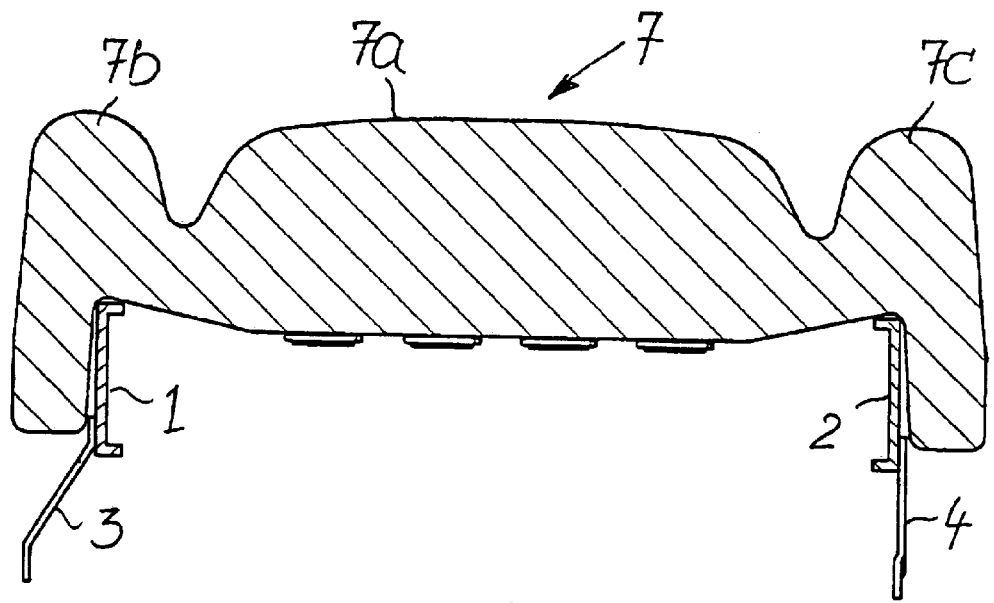
FIG. 3 is a cutaway view through a seat base along projection III—III in FIG. 1.

Upholstery 7 lies on top of the springs that includes a central upholstered area 7a and two side bolsters 7b and 7c adjacent to the edges of the central upholstered area 7a. The shaped wire springs 15–18 are compressed longitudinally close to the seat surface in an untensioned condition that is, the shaped wire springs 15–18 tend to naturally expand upwards and push up the upholstery as shown in FIGS. 1 and 3. Therefore, in the soft seat setting, in which the tension belts 19–22 are loose, the springs urge upward and the seat surface of the central upholstered area 7a is at about the same height as the upper edges of the side bolsters 7b and 7c, as may be seen in FIG. 3.

Figure 4:
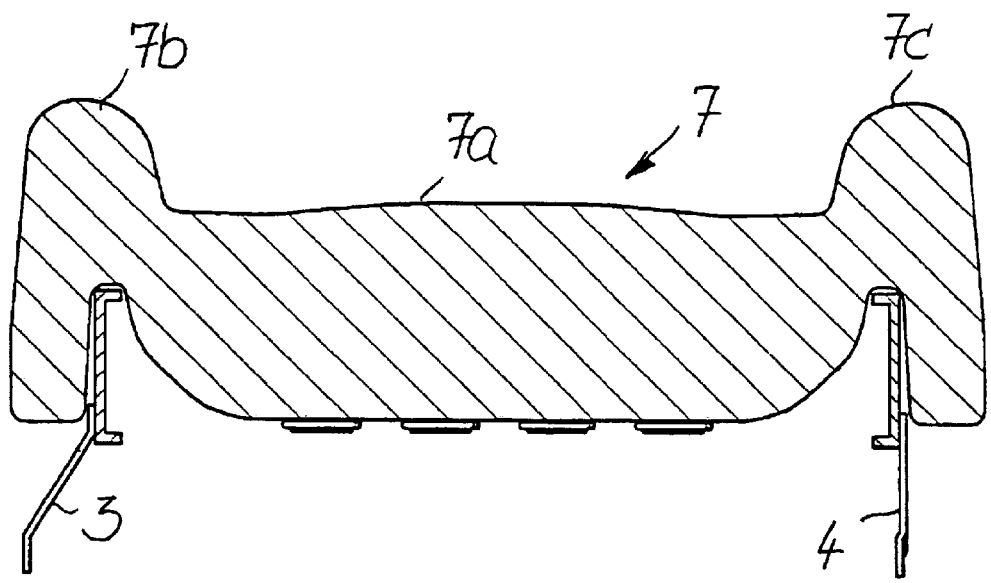
FIG. 4 is a cutaway view through a seat base along projection IV—IV in FIG. 2.

When the wind-up spool 10 is turned, the tension belts 19–22 are all tensioned simultaneously. This reduces the arching of the springs, increasing seat firmness. For the maximum tension of the tension belts 19–22 shown in FIGS. 2 and 4, the springs are in a plane and the seat load is partially assumed by the tension belts 19–22. The seat surface of the central upholstered area 7a is below the upper edges of the side bolster 7b and 7c as FIG. 4 shows, so that the seat occupant receives proper lateral support as well.

What is claimed is:

1. A tension mechanism for use with a seat having a frame with a plurality of springs having an undulating shape defining tension belt receiving areas and having a support side, said plurality of springs attached between two opposing braces in said frame, said tension mechanism comprising:

a plurality of tension belts having first and second ends and disposed in said tension belt receiving areas and adapted for adjusting a vertical displacement of said support side of each of said plurality of springs, each of said plurality of tension belts coupled proximate at least said first end to an adjustable tension belt tensioning device adjustable to produce more or less tension in said plurality of tension belts, wherein the vertical displacement of said support side of each of said plurality of springs is less when said plurality of tension belts are under low tension than when they are under higher tension.

2. The tension mechanism for a seat as in claim 1, wherein said second end of each of said plurality of tension belts is adapted to be attached to said seat frame.

3. The tension mechanism for a seat as in claim 2, wherein each of said tension belts engages one of said plurality of springs alternately from above and below in a longitudinal direction.

4. The tension mechanism for a seat as in claim 3, wherein said adjustable tension belt tensioning device includes a wind-up spool.

5. The tension mechanism for a seat as in claim 4, wherein a rotational axis of said wind-up spool is generally perpendicular to said longitudinal direction and wherein all said plurality of tension belts may be simultaneously tensioned via said wind-up spool.

6. The tension mechanism for a seat as in claim 4, wherein said wind-up spool is operated by a drive motor.

7. The tension mechanism for a seat as in claim 1, wherein said first end of each of said plurality of tension belts passes over at least one direction-changing device.

8. The tension mechanism for a seat as in claim 1, wherein side edges of each of said plurality of tension belts are each positioned adjacent to an inner side of tension belt receiving areas of said springs.

9. The tension mechanism for a seat as in claim 1, wherein each of said plurality of tension belts pass over and under adjacent cross members formed by each of said of said springs.

10. The tension mechanism for a seat as in claim 1, wherein changing said tension of each of said plurality of tension springs adjusts a vertical displacement between seat side members and a central seat portion.

11. A tension mechanism for use with a seat having a frame with a plurality of springs having an undulating shape defining tension belt receiving areas and having a support side, said plurality of springs attached between two opposing braces in said frame, said tension mechanism comprising:

a plurality of tension belts having first and second ends and disposed in said tension belt receiving areas of said springs, and adapted for adjusting a vertical displacement of said support side of each of said plurality of springs, each of said plurality of tension belts coupled proximate at least said first end to a tension belt tensioning device adapted to produce more or less tension in said plurality of tension belts, said second end of each of said plurality of tension belts attached to said seat frame, said tensioning device including a wind-up spool wherein a rotational axis of said wind-up spool is disposed generally perpendicular to a longitudinal direction of said springs, and wherein all said plurality of tension belts may be simultaneously tensioned via said wind-up spool, wherein the vertical displacement of said support side of each of said plurality of springs is less when said plurality of tension belts are under low tension than when they are under higher tension.

12. A tension mechanism for use with a seat having a frame with a plurality of springs having an undulating shape defining tension belt receiving areas and having a support side, said plurality of springs attached between two opposing braces in said frame, said tension mechanism comprising:

a plurality of tension belts having first and second ends and disposed in said tension belt receiving areas and adapted for adjusting a vertical displacement of said support side of each of said plurality of springs, each of said plurality of tension belts coupled proximate at least said first end to an adjustable tension belt tensioning device adjustable to produce more or less tension in said plurality of tension belts irrespective of tension on said tension belts created by a user's weight, wherein the vertical displacement of said support side of each of said plurality of springs is less when said plurality of tension belts are under low tension than when they are under higher tension.

* * * * *